March 21, 1950   H. H. HOPKINS ET AL   2,501,219
VARIABLE MAGNIFICATION OPTICAL SYSTEM
Filed Oct. 22, 1948   4 Sheets-Sheet 1

INVENTOR
Harold H. Hopkins
+ Henry Waito
By Watson, Cole, Grindle + Watson

March 21, 1950 H. H. HOPKINS ET AL 2,501,219
VARIABLE MAGNIFICATION OPTICAL SYSTEM
Filed Oct. 22, 1948 4 Sheets-Sheet 2

INVENTOR
Harold H. Hopkins
+ Henry Waitt
By Watson, Cole,
Grindle + Watson

March 21, 1950  H. H. HOPKINS ET AL  2,501,219
VARIABLE MAGNIFICATION OPTICAL SYSTEM
Filed Oct. 22, 1948  4 Sheets-Sheet 3

INVENTOR
Harold H. Hopkins + Henry Waitt
By Watson, Cole, Grindle + Watson

Patented Mar. 21, 1950

2,501,219

UNITED STATES PATENT OFFICE 2,501,219

VARIABLE MAGNIFICATION OPTICAL SYSTEM

Harold Horace Hopkins and Henry Waitt, London, England, assignors to W. Watson & Sons Limited, London, England, a British company Application October 22, 1948, Serial No. 55,964
In Great Britain November 3, 1947

4 Claims. (Cl. 88—57)

This invention relates to variable magnification optical systems of the kind (hereinafter referred to as the kind described) which may be used alone or in conjunction with a further optical system (e. g., the lens system of a camera) to produce an image of continuously variable size of an object at a fixed distance from the system. Such systems may be used for example with a stationary cine camera or television transmitting camera in order continuously to increase or decrease the size of the image, on the film or other image receiving device, of objects in the scene towards which the camera is directed and thereby to give the impression when the film is projected, or the television receiver is viewed, that the view-point approaches or recedes from objects in the scene.

A known variable magnification optical system of the kind described comprises two fixed negative (divergent) lenses and an axially movable positive (convergent) lens arranged on a common optical axis, the movable lens being between and spaced from the two fixed lenses. In such a system the distance from the fixed lenses at which the image of a fixed object is accurately focussed varies when the axial position of the movable lens is varied in order to vary the size of the image. Since the distance of the film, or other image receiving device, from the fixed lenses, is fixed, it is found necessary in practice to limit the effective aperture of the system to a relatively small value by a suitable stop in order to increase its so-called depth of focus and thereby to minimise the defocussing effected when the image size is varied. Such limitation of the effective aperture is inconvenient as it limits the amount of light passing through the system.

It is an object of the invention to provide an improved variable magnification system of the kind described which maintains the image accurately in focus while the size of the image is substantially varied and in which the need for a small relative aperture is obviated.

The invention consists in an optical system of the kind described comprising two fixed negative (divergent) lenses and two axially movable positive (convergent) lenses arranged on a common optical axis, the movable lenses being between and spaced from the two fixed lenses, and adjusting means for continuously and simultaneously differentially moving the positive lenses in the axial direction of the system by amounts such that the distance, from the fixed lenses, at which the image of an object at a fixed distance from the fixed lenses is accurately focussed remains constant while the size of the said image is continuously varied during the operation of the adjusting means.

Preferably the optical system is constructed in the form of an attachment arranged to fit in front of a camera or other optical device. The two fixed negative lenses may be carried by a body tube which contains the movable positive lenses. The movable positive lenses may be mounted in two tubes slidably carried within the body tube, and preferably one of the sliding tubes slides within the other.

The appropriate movements are preferably imparted to the movable lenses by means for causing relative axial movement of nested tubes as described in co-pending application No. 55,966 of even date.

A specific embodiment of the invention will now be described by way of example and with reference to the accompanying drawings in which—

Figure 1:
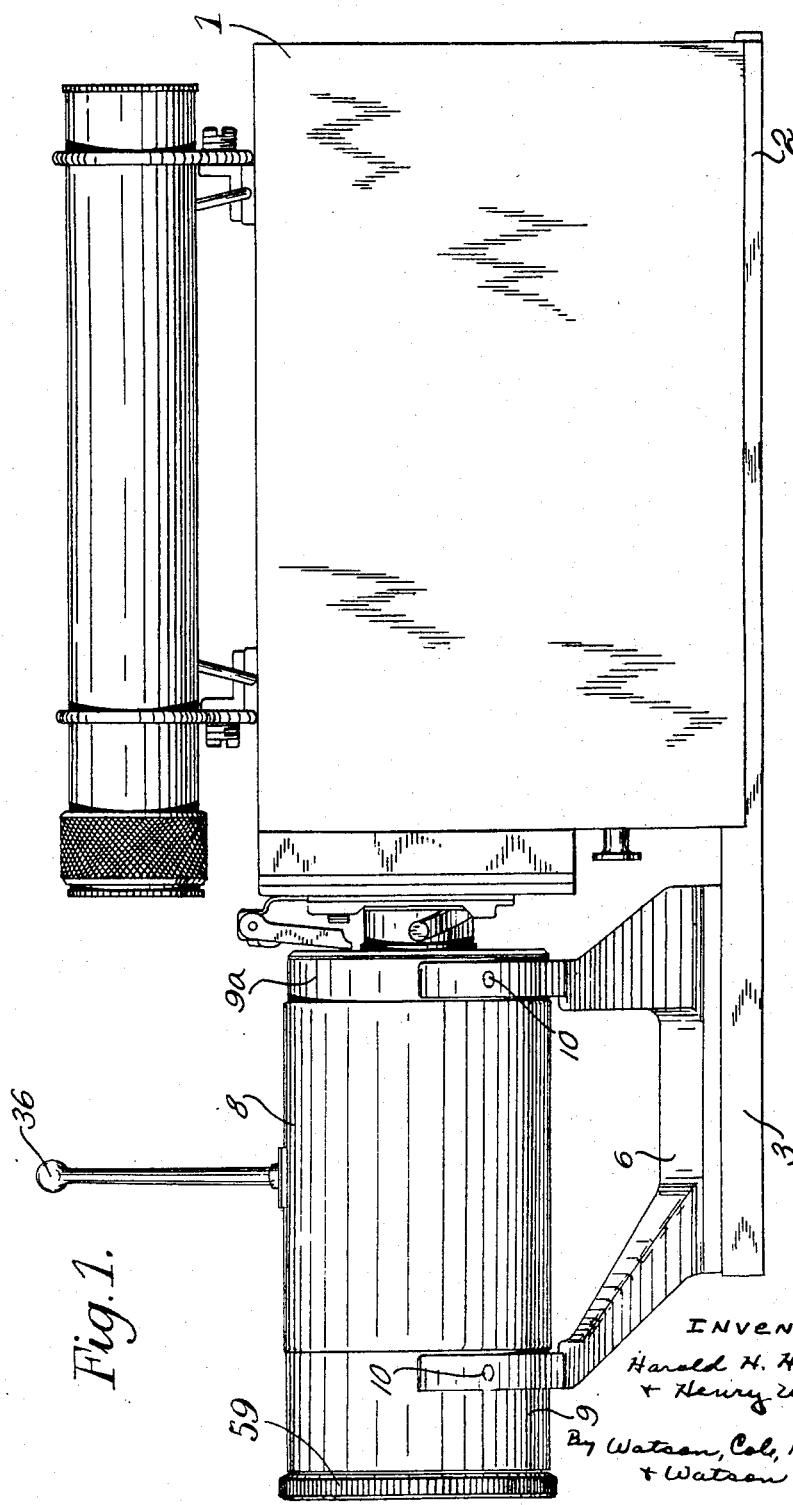
Figure 1 is a side view of an attachment embodying an optical system according to the invention and fitted to a cine camera.
Figure 2:
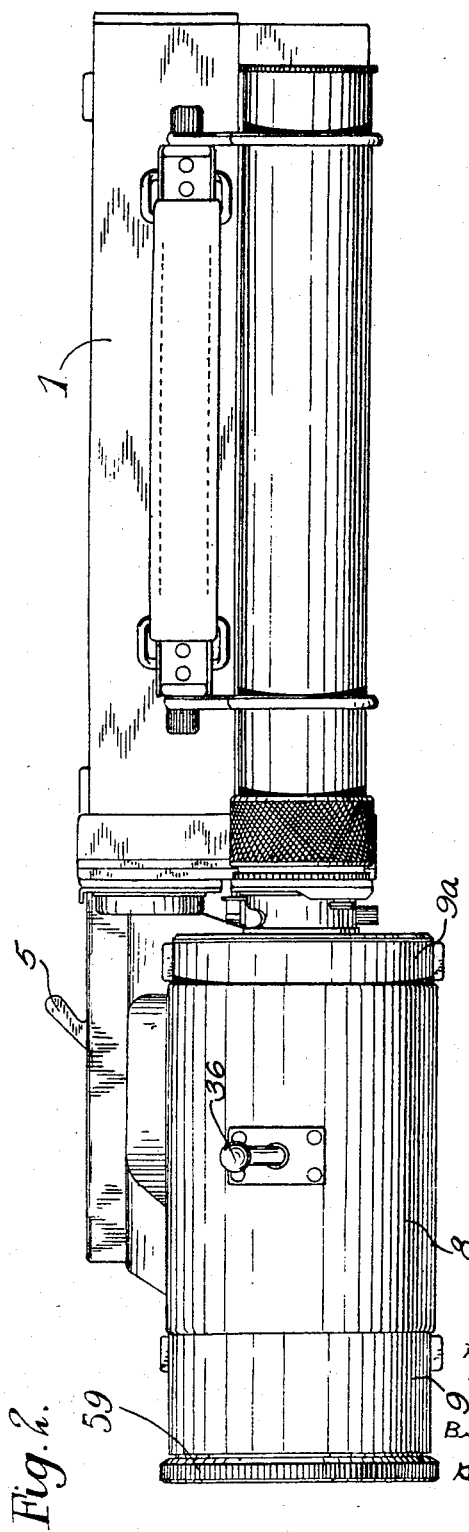
Figure 2 is a plan view of the arrangement shown in Figure 1.
Figure 3:
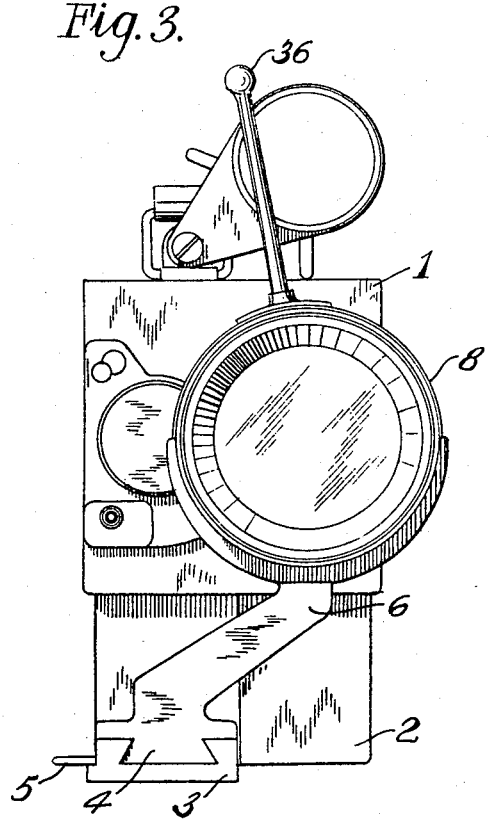
Figure 3 is a front view of the same arrangement.
Figure 4:
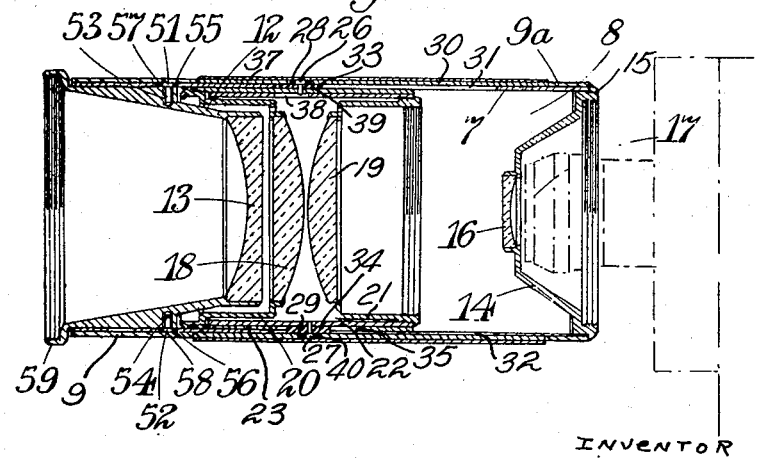
Figure 4 is a sectional view of the attachment, with the front part of the cine camera indicated by chain lines.

The cine camera 1 is mounted on a base 2 which has a forward extension 3 on which a bracket 6 is carried by means of a dovetail tongue and groove connection 4 lockable by a pivoted key 5. The bracket 6 is attached to each end of the body tube 7 of the attachment 8 by means of two spacing rings 9, 9a and screws 10. To the front end of the body tube 7 is attached, by means described in copending application No. 55,965 of even date, a cell 12 carrying a negative lens which in this example is a biconcave lens 13 and which constitutes the front fixed negative lens of the system. The body tube 7 carries at its rear end a cell 14 attached to it by a screwthread 15 and carrying a plano-concave lens 16 which is the rear fixed negative lens of the system. The rear lens cell 14 projects inwardly into the attachment and its outer surface surrounds the objective lens carrier 17 of the cine camera 1 and prevents light, other than that which passes through the attachment, from entering the camera.

The plano-convex lenses 18 and 19 are carried in cells 20 and 21, mounted respectively in a tube 23 and a tube 22, and form the two movable positive lenses of the system. The tube 22, carrying the rear positive lens 19, slides within the tube 23, carrying the front positive lens 18, and the tube 23 slides within the body 7.

Figure 5:
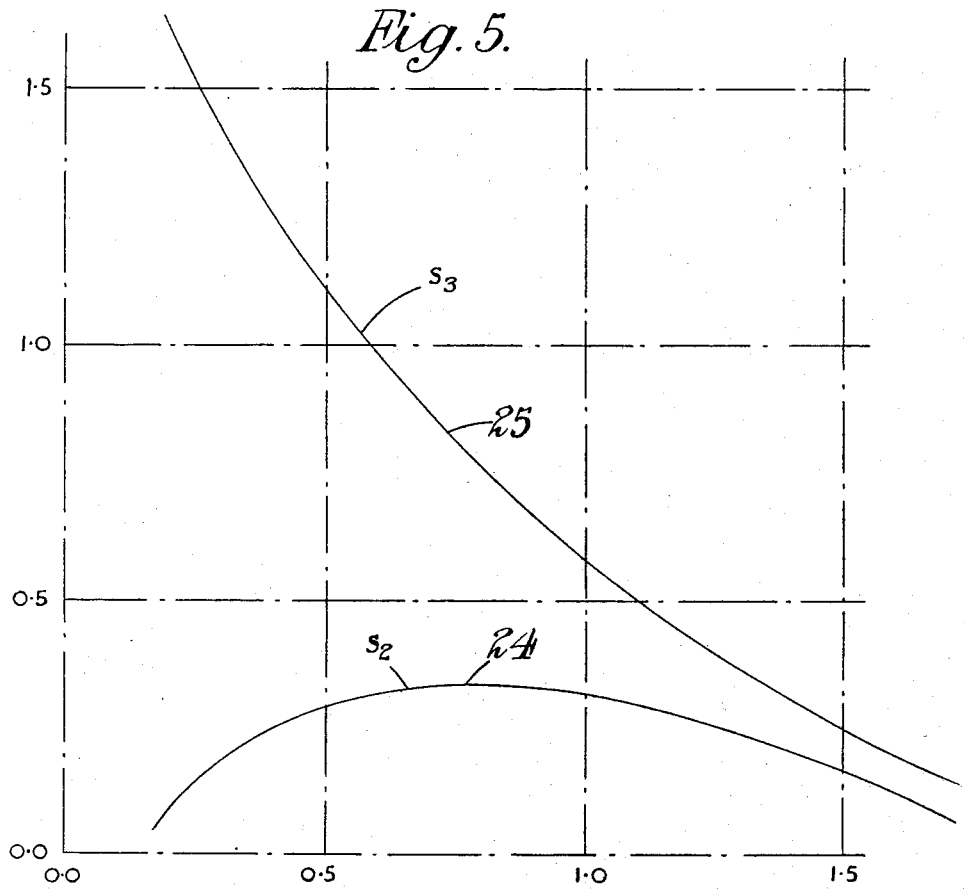
Figure 5 is a graph indicating the nature of the axial movements imparted to the movable lenses in the attachment, and Figure 6 indicates the distances to which the curves of Figure 5 refer.
Figure 6:
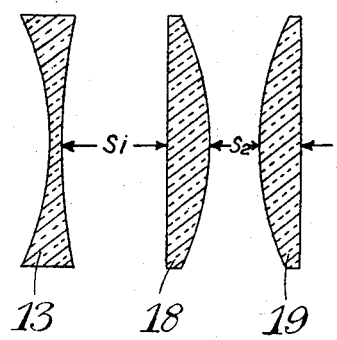

The bodily and relative movements which it is necessary to impart to the movable lenses in order to enable the image size to be continuously varied without defocussing may be computed employing the usual methods of calculation from the optical constants of the lenses, the separation of the fixed lenses and like factors. An example of the required movements for a particular combination of lenses is shown in Figure 5, in which the curves 24 and 25 indicate respectively the required relative movements of the two lenses 18 and 19 and the required movement of the lens 19 with respect to the lens 16, as functions of the movement of the lens 18 with respect to the lens 13. The distances $S_1S_2$ and $S_3$ to which the curves of Figure 5 relate are shown in Figure 6.

The necessary movements are in this example imparted to the lenses 18, 19 by means as described in co-pending application No. 55,966 of even date. This means comprises two pins 26 and 27 extending respectively radially outwards from the tubes 23 and 22 and carrying feathers 39 and 40 which engage the sides of curved cam slots 28 and 29 in an outer tube 30 which is carried on the body tube 7 and is partially rotatable thereon about its axis. The lens carrying tubes 22 and 23 are prevented from rotating and are constrained for axial movement by means of two straight longitudinally extending slots 31 and 32 which are formed in the body tube 7, the sides of which slots engage feathers 33 and 34 carried on the pins 26 and 27 which pass respectively through the two longitudinally extending slots 31 and 32.

The pin 27 also passes through, and the feather 34 lies partly within, a longitudinally extending clearance slot 35 which is formed in the outer movable lens carrying tube 23 and is sufficiently large not to restrict the movements of the pin 27 and the feather 34. A longitudinally extending clearance slot 38 is also provided in the inner movable lens carrying tube 22 to receive a projection, through the inner surface of the tube 23, of the pin 26 without restricting the movement of the pin 26.

The cam slots 28 and 29 in the rotatable tube 30 are so shaped that as the tube 30 is rotated, by means of a handle 36, the feathers 39, 40 and pins 26, 27 travel along the slots 28 and 29 and move the lens carrying tubes 22 and 23, to which they are attached, axially in the manner required. The necessary shapes of the slots 28 and 29 may be calculated from computed curves of the kind shown in Figure 5. The rotatable tube 30 is enclosed within a cover tube 37 which is attached to it and protects the slots 28 and 29 and retains the feathers 39, 40.

If M and $m$ are respectively the maximum and minimum magnifications of the system and F is the focal length of the camera objective with which it is used then the effective focal length of the system together with the camera objective may be varied between $mF$ and $MF$. Since the size of the image depends on this effective focal length it will be seen that a system according to the invention is not restricted for use with one particular camera objective and may be employed with any of a number of camera objectives having different focal lengths to obtain a corresponding number of ranges of variation in the size of the image. It is preferred that the two inner, movable, lenses have equal focal lengths and that the range of adjustment of the lenses to vary the magnification is, from a position at which they have a magnification of $-1$, in one direction to a limiting position in which the magnification is $-\sqrt{R}$ and in the other direction to a limiting position in which the magnification is $$-\frac{1}{\sqrt{R}}$$

where $R = M/m$. This arrangement provides the minimum of movement for a given range of magnification which is optically desirable and is further advantageous in that the cams for imparting the required movements to the inner lenses are less steep than for other arrangements. Further the length and diameter of the system may be kept to a minimum. Preferably the two outer, fixed, lenses also have equal, or nearly equal, focal lengths and are arranged to have focal lengths as long as is compatible with the necessity for a clearance between them and the inner lenses at the extreme positions of the inner lenses.

As an example, one form of the invention employs two negative members each of focal length approximately $-3"$ and two positive members each of focal length approximately $4"$ and the ratio $M/m$ is approximately 2.

The invention is not restricted to the mechanical and constructional details described herein, e. g., the movable lenses may be moved by suitable cranks or eccentrics or by other means in place of or in conjunction with pins and curved cam slots. Further an optical system according to the invention may be constructed as an integral part of a camera or may be incorporated with other optical systems (e. g., a telescopic viewfinder) in a camera. The invention is also applicable to a camera obscura or other directly viewed image forming camera.

The term "fixed lens" is to be understood to mean a lens which remains stationary during the continuous variation of the image size by means of the optical system in which it is incorporated.

It will be appreciated that the word "lens" is not restricted in its meaning to a simple lens but includes a compound lens comprising two or more component simple lenses in contact or spaced apart by a fixed amount.

We claim:

1. A variable magnification optical system comprising two fixed negative lenses and two movable positive lenses arranged on a common optical axis, with the movable lenses between and spaced from the two fixed lenses, and mechanical adjusting means operable to effect simultaneously movements of the two movable lenses, relative to the fixed lenses and relative to each other, in the axial direction and according to a law such that the distance, from the fixed lenses, at which the image of an object at a fixed distance from the fixed lenses is accurately focussed by the system remains constant while the size of the said image is continuously varied during the operation of the adjusting means.

2. A variable magnification optical system comprising two coaxial axially movable tubes, two positive lenses carried by the two tubes respectively and on a common optical axis, a fixed supporting tube outside and concentric with the two movable tubes, two negative lenses carried by the supporting tube on the aforesaid optical axis outside the positive lenses, and mechanical adjusting means operable to effect simultaneously movements of the two movable tubes, relative to the supporting tube and relative to each other, in the axial direction and according to a law such that the distance, from the fixed lenses, at which the image of an object at a fixed distance from the fixed lenses is accurately focussed by the system remains constant while the size of the said image is continuously varied during the operation of the adjusting means.

3. A variable magnification optical system comprising two coaxial axially movable tubes, two positive lenses carried by the two tubes respectively and on a common optical axis, a fixed supporting tube outside and concentric with the two movable tubes, two negative lenses carried by the supporting tube on the aforesaid optical axis outside the positive lenses, projections from the two movable tubes respectively each extending outwards from the tubes into cooperative guiding engagement with at least one guide slot in the support tube, the guide slot extending in the axial direction of the assembly and the engagement of the projections within the slot limiting circumferential movement of the projections and cam means rotatable as a unit about the axis of the assembly and engageable with the projections to effect, on rotation of the cam means, differential movements of the two projections and the tubes connected thereto in the axial direction, and according to a law such that the distance, from the fixed lenses, at which the image of an object at a fixed distance from the fixed lenses is accurately focussed remains constant while the size of the said image is continuously varied during the operation of the adjusting means.

4. An optical system comprising two concentric relatively axially movable nested tubes, two positive lenses carried by the two tubes at opposite ends thereof respectively and on a common optical axis, a fixed supporting tube outside and concentric with the two movable tubes, two negative lenses carried by the supporting tube on the aforesaid optical axis outside the positive lenses, a projection from one of the movable tubes extending in the radial direction through an axially extending slot in the wall of the other movable tube into co-operative guiding engagement with a guide slot in the support tube, a projection from the other movable tube at a position diametrically opposed to the first projection and extending in the radial direction into co-operative guiding engagement with a second guide slot in the support tube, the guide slots extending in the axial direction of the assembly and the engagement of the projections with the slots limiting circumferential movement of the projections and cam means rotatable as a unit about the axis of the assembly and engageable with the two projections to effect, on rotation of the cam means, differential movements of the two projections and the tubes connected thereto in the axial direction, and according to a law such that the distance, from the fixed lenses, at which the image of an object at a fixed distance from the fixed lenses is accurately focussed remains constant while the size of the said image is continuously varied during the operation of the adjusting means.

HAROLD HORACE HOPKINS.
HENRY WAITT.

REFERENCES CITED

The following references are of record in the file of this patent:

UNITED STATES PATENTS

| Number | Name | Date |
| --- | --- | --- |
| 212,099 | Knapp | Feb. 11, 1879 |
| 696,788 | Allen | Apr. 1, 1902 |
| 1,950,166 | Durholz | Mar. 6, 1934 |
| 1,988,390 | Naumann | Jan. 15, 1935 |
| 2,184,018 | Ort | Dec. 19, 1939 |
| 2,235,364 | Gramatzki | Mar. 18, 1941 |

FOREIGN PATENTS

| Number | Country | Date |
| --- | --- | --- |
| 21,211 | Great Britain | of 1901 |
| 3,799 | Great Britain | of 1912 |